US005849143A

United States Patent [19]

Ingalls

[11] Patent Number: 5,849,143

[45] Date of Patent: Dec. 15, 1998

[54] PRECISION LABEL APPLICATION

[75] Inventor: James E. Ingalls, Sebring, Fla.

[73] Assignee: Booth Manufacturing Company, Ft. Pierce, Fla.

[21] Appl. No.: 839,907

[22] Filed: Apr. 18, 1997

[51] Int. Cl.[6] ........ B32B 31/00

[52] U.S. Cl. ........ 156/556; 156/541; 156/542; 156/361; 156/DIG. 33

[58] Field of Search ........ 156/556, 540, 156/541, 542, DIG. 1, DIG. 2, DIG. 33, 361, 362

[56] References Cited

U.S. PATENT DOCUMENTS

| | | | |
|---|---|---|---|
| 3,436,294 | 4/1969 | Marano | 156/542 X |
| 4,270,968 | 6/1981 | Dudzik et al. | 156/542 X |
| 5,011,561 | 4/1991 | Carolus et al. | 156/361 X |

*Primary Examiner*—James Engel

*Attorney, Agent, or Firm*—Carroll F. Palmer

[57] ABSTRACT

A system for applying pressure sensitive adhesive labels from a feed web with high position precision onto flat uniform size articles mechanically links the advance of the article to be labeled and the advance of the current label to be applied in unison, so that forward advancement speed of the article and the current label are matched exactly, independent of any speed variation in the application system. This is accomplished using a label following member that comes to rest at the trailing edge of a succeeding label and is freely allowed to follow the succeeding label as it advances on the web spaced downstream of the current label. Such following member is mechanically coupled to a pusher which advances the article to be labelled in the precise speed and relative location of the current label as it advances, thereby accurately placing the current label on the article as it peels from the continuous support web. As the label following member and the article pusher are always in exact unison with each other, any variation in their coupled speed of movement in the system is not significant so precision movement sensors are not required.

6 Claims, 7 Drawing Sheets

PRECISION LABEL APPLICATION

BACKGROUND OF THE INVENTION

1. Field of the Invention

This application relates to improved methods and equipment for precision label application. More particularly, it concerns very accurate application of thin pressure sensitive labels to flat uniform articles.

2. Description of the Prior Art

The application of labels to articles is a highly developed art since articles requiring labeling vary greatly in size and shape. There is less variation in nature of the labels and in a majority of the cases, the labels are dispensed from a continuous web of backing material having labels affixed thereto and applied to a continuous stream of articles supplied to a labeling station. Typical examples of such label applying equipment are disclosed in U.S. Pat. Nos. 5,112,429, 5,232,540 and 5,472,552. The present invention provides further improvements in this class of label applying equipment.

In many label applications, accurate positioning of labels is not important, but in some precise positioning of the label on the article is required, e.g., see U.S. Pat. No. 5061334.

Typical label applying systems designed for precise positioning of the labels comprise label and article sensors, e.g., advanced electro-optics and means to match the speeds of both the article conveyor or similar article transport and the label applicator, e.g., accurate servo and stepper drive systems. To maintain precise control on such equipment is expensive and all errors in operation are accumulative. This is further complicated when applying clear, thin plastic labels that are carried to the application station on a clear plastic web. Typical current industry standards for label placement accuracy is ±0.031 to. 0.62 " .

The present invention provides new improvements in the art of precise position application of labels, dispensed from a continuous web of backing material having the labels affixed thereto and applied to a continuous stream of flat uniform articles supplied to a labeling station, with a placement accuracy of ±0.010".

OBJECTS

A principal object of the invention is the provision of new improvements in method and equipment for precision application of pressure sensitive labels to a stream of flat uniform articles.

Further objects include the provision of:

1. Unique method and equipment for precision application of pressure sensitive labels to a stream of articles with a placement accuracy of ±0.010".
2. New label application method and equipment that utilizes a simple mechanical link which allow the article and label to be in perfect unison for each article and label union cycle.
3. New label application method and equipment that avoid the inaccuracies and complications associated with independent label application and product transport.
4. New label application method and equipment capable of applying thin (1-mil) paper, plastic or foil pressure sensitive labels to flat uniform articles while achieving a placement accuracy of ±0.010" without use of expensive electro-optics, servo and stepper drives or expensive, complicated circuitry logic and timers.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by mechanically linking the advance of the flat uniform article to be labeled and the advance of the label to be applied in unison, so that forward advancement speed of the article and the label are matched exactly, independent of any speed variation in the application system.

Basically the invention comprises providing in a precision label application system, at least one label following member that comes to rest at the trailing edge of each label and is freely allowed to follow the label as it advances. Such following member is mechanically coupled to a pusher rod which advances the article to be labelled in the precise speed and location of the label as it advances, thereby accurately placing the label on the article as it peels from the continuous support web. As the label following member and the article pusher are always in exact unison with each other, their speed of movement is not significant so precision sensors are not required. Since speed and distance parameters are not part of the accuracy equation, the new method and equipment do not result in accumulation of errors.

The present invention provides a unique label application method to precisely apply thin pressure sensitive adhesive labels defined by a peripheral edge to flat uniform size articles. This new method basically involves the combination of (a) delivering the labels carried from a supply source seriatim upon a continuous web along a first fixed path to a stripping station at which the labels are removed from the web, the first fixed path comprising a first straight terminal portion as it approaches the stripping station, (b) moving the articles seriatim to the stripping station along a second fixed path to the stripping station, the second fixed path comprising a second straight terminal portion that parallels the first straight terminal portion as it approaches the stripping station, (c) detecting forward motion of a peripheral edge of each the adhesive label as the label traverses the first fixed path, and (d) controlling the movement of each article as it traverses the second fixed path by means of the detected forward motion of the peripheral edge of each adhesive label.

In a preferred embodiment, the movement of each article as it traverses the second fixed path is mechanically linked to the forward motion of the peripheral edge of each adhesive label as the label traverses the first fixed path so that forward advancement speed of said article and said label are matched exactly.

In one embodiment, there is a single label following member and in another embodiment there are a plurality of label following members. The use of multiple following members provide added security to precisely detect a label edge of thin labels, i.e., if one follower misses the edge of a label or the label curls or there is adhesive bleed, the second or third follower can correct. Also, the additional followers allow the machine to continue if there is a missing label on the continuous web. In any embodiment, the followers are adjustable for different label lengths and are used with adjacent labels.

BRIEF DESCRIPTION OF THE DRAWINGS

A more complete understanding of the invention can be obtained by reference to the accompanying drawings in which generic parts of the illustrated matter are indicated by arrowhead lines associated with the designation numerals while specific parts are indicated with plain lines associated with the numerals and wherein.

DESCRIPTION OF THE PREFERRED EMBODIMENTS

Figure 1:
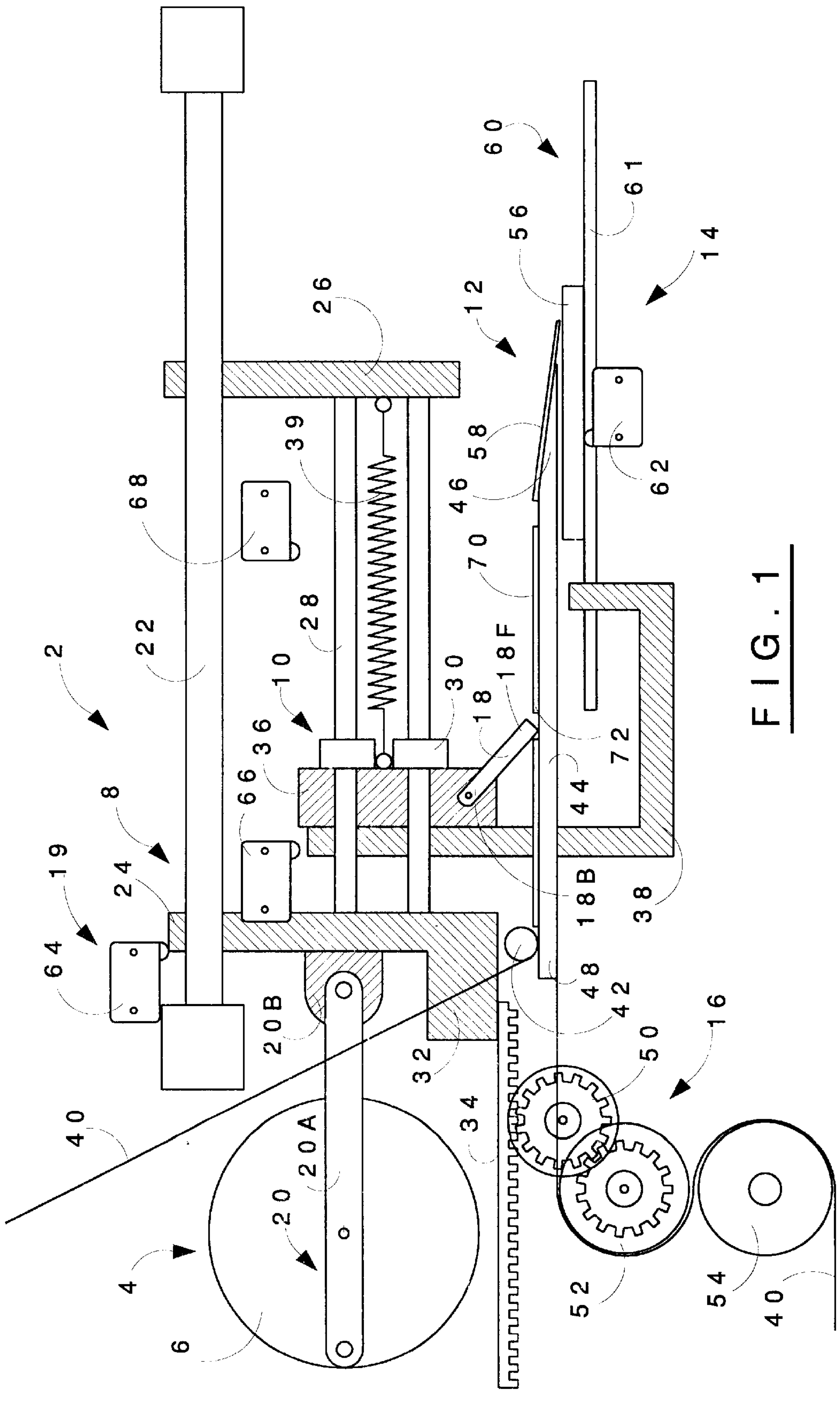
FIG. 1 is a schematic lateral view of a label applying system of the invention at the beginning of an label application cycle.

Referring in detail to the drawings, the label application system 2 of the invention basically comprises motor means 4 including drive wheel 6, main carriage 8, free carriage 10, label delivery means 12, article handling means 14, web handling means 16, follower member 18 and electronic control means 19.

The main carriage 8, which is reciprocated by wheel 6 via crank means 20 including arm 20A and lug 20B, comprises guide rods 22 that slidably carry first support 24 and second support 26 between which are fixed slide rods 28 carrying stoppers 30. First support 24 includes a base extension 32 that carries a rack 34.

The term crank means is used in this description and the accompanying claims in a generic sense to include not only a disc and lever as shown, but also a cam or equivalent mechanical device.

The free carriage 10 comprises block 36 slidably carried on slide rods 28, article pusher means 38 and spring 39 that biases free carriage 10 toward stoppers 30.

The label delivery means 12 comprises label support web 40 delivered from a supply roll (not shown), guide roller 42, label platform 44 with tapered delivery end 46 and entrance end 48.

The web handling means 16 comprises a clutch pinion 50, a geared roller 52 driven by pinion 50 and free pinch roller 54 by which the web 40 exits the system 2.

The article handling means 14, which supports the article 56 during the application of a current label 58 to article 56, comprises article exit means 60 including transport plate 61, article switch 62 and article delivery means (not shown), e.g., belt conveyor, robot arm, etc.

The follower member 18 is pivoted at end 18B on block 36 allowing free end 18F be dragged freely in the direction of guide roller 42 by the block 36.

The electronic means 19 comprises stop switch 64, carriage switch 66, clutch switch 68 and article switch 62. Switches 62 & 64 are operatively connected to motor means 4 and Switches 66 & 68 are operatively connected to clutch pinion 50.

A cycle in operation of the system 2 begins, as shown in FIG. 1, with clutch pinion 50 disengaged and web 40, current label 58 and succeeding label 70 at rest. Then, placement of article 56 in position on the transport plate 61 activates the switch 62 thereby powering the motor means 4 to turn wheel 6 coupled to the main carriage 8.

Figure 2:
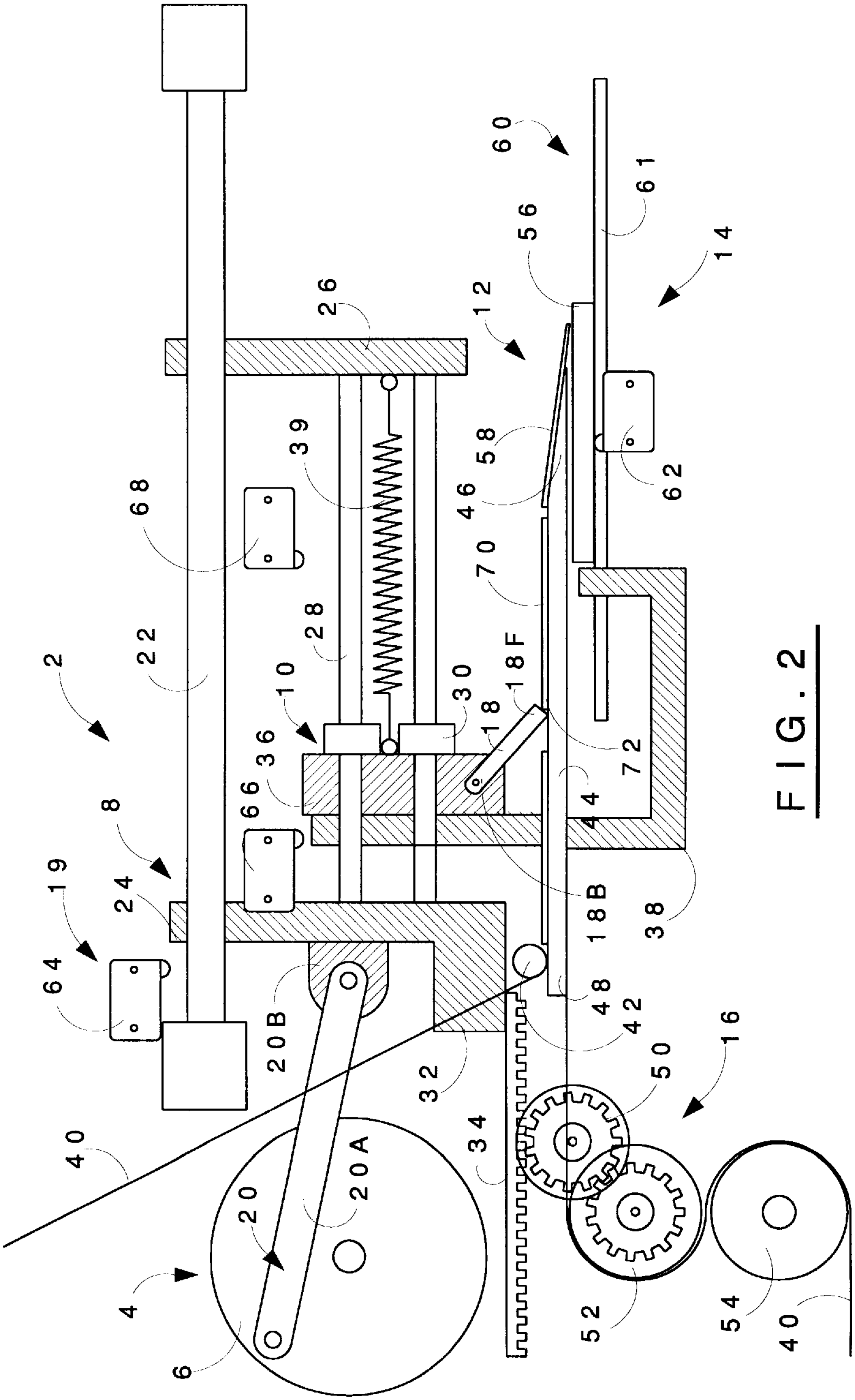
FIGS. 2–6 are schematic lateral views similar to FIG. 1 at succeeding stages in the label application cycle beginning in FIG. 1.

As the wheel 6 rotates to the position as shown in FIG. 2, the forward speed of the main carriage 8 increases gradually owing to the action of crank means 20. This initial low speed allows the free end 18F of follower member 18 to engage on the rear edge 72 of the succeeding label 70 without causing damage to the label material.

The succeeding label 70 does not need to be the label immediately following the current label 58, i.e., it can be further removed from current label 58 if the label platform 44 is more extended than shown in the drawings.

In alternate embodiments of systems of the invention, the follower member 18 can be a mechanical or electronic cam (not shown) rather than a gravity operated lever as shown.

Figure 3:
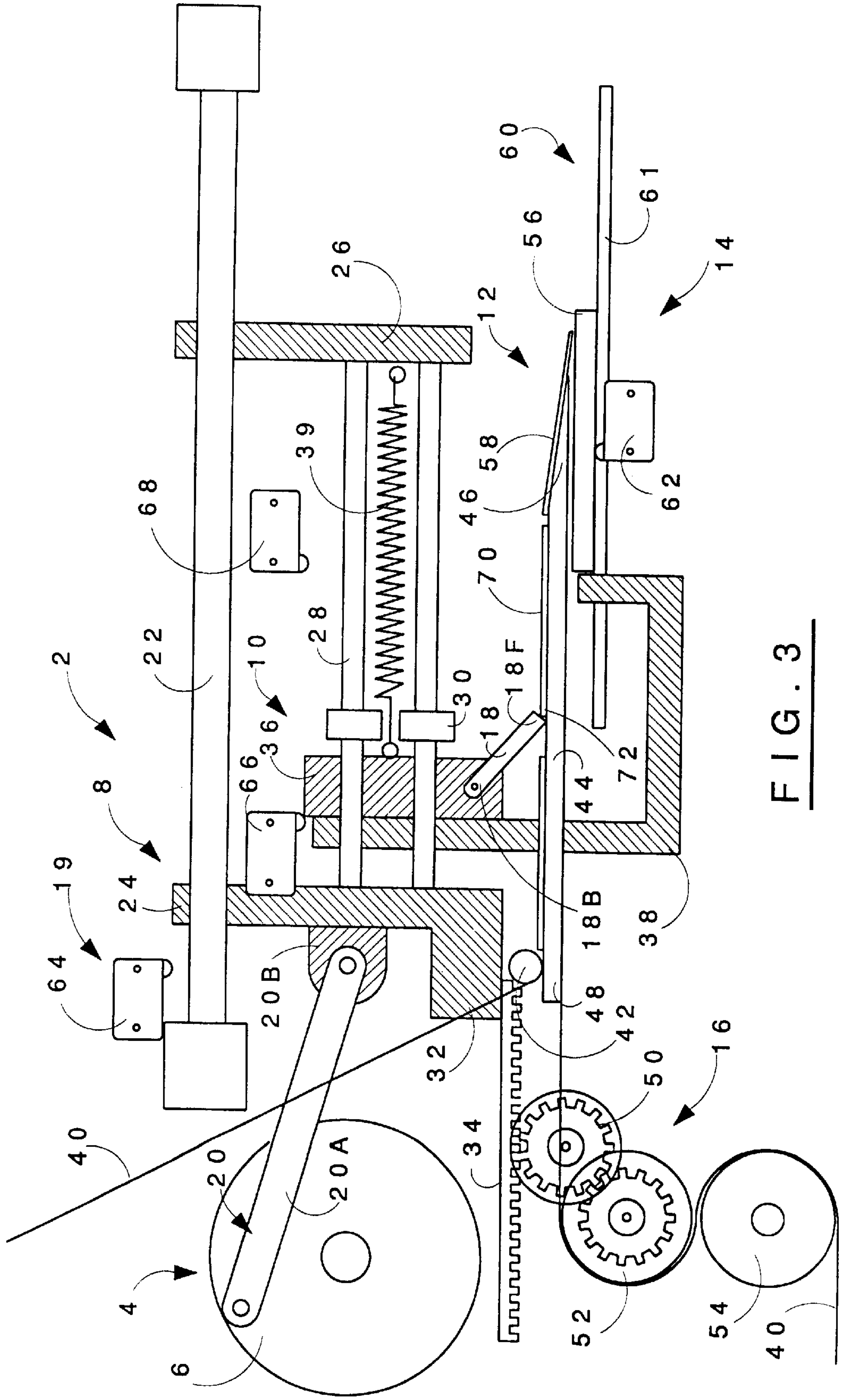

As the forward motion of the main carriage 8 continues as shown in FIG. 3, the free carriage 10 will become motionless, due to the label follower 18 being at rest against the rear edge of the succeeding label 70, but will move relative to the main carriage until the block 36 of the free carriage 10 activates the switch 66. When this occurs as shown in FIG. 3, the switch 66 activates the clutch pinion 50 resulting in rotation of the geared roller 52 and free pinch roller 54. The rotation of these rollers pulls the web 40 across the label platform 44 and around its tapered end 46 thereby stripping the current label 58 from the backing web 40. It is apparent that the succeeding label 70 will have a forward motion at the same speed as the current label 58 being applied to the article 56.

The forward motion of the succeeding label 70 results in forward movement of the follower member 18 in unison with the current label 58. This forward motion, owing to the mechanical coupling is transferred to the article pusher 38 via the free carriage 10. The article pusher 38 owing to the mechanical coupling with the follower member 18 will position the article 56 in exact location in relationship to the current label 58 (plus or minus any tolerance variations between the succeeding label 70 and current label 58). In addition, the forward motion of the article 56 and the current label 58 will be at exactly the same speed.

With the label platform 44 positioned parallel to the article 56, the current label 58 is applied to the article 56 very accurately without any pulling or pushing of the article caused by the forward motion of the current label 58 which would be the result of speed differentials.

Figure 4:
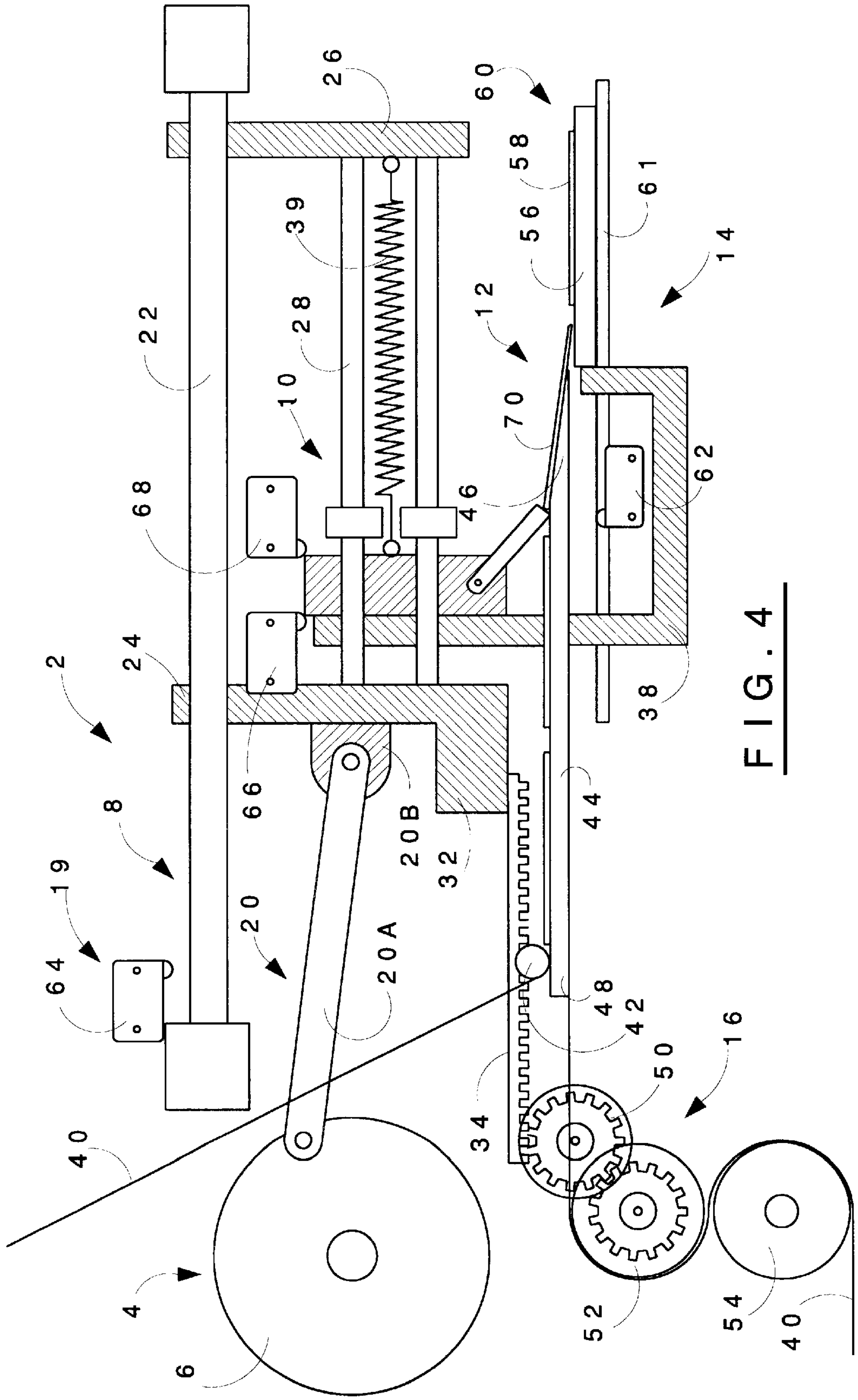
Figure 5:
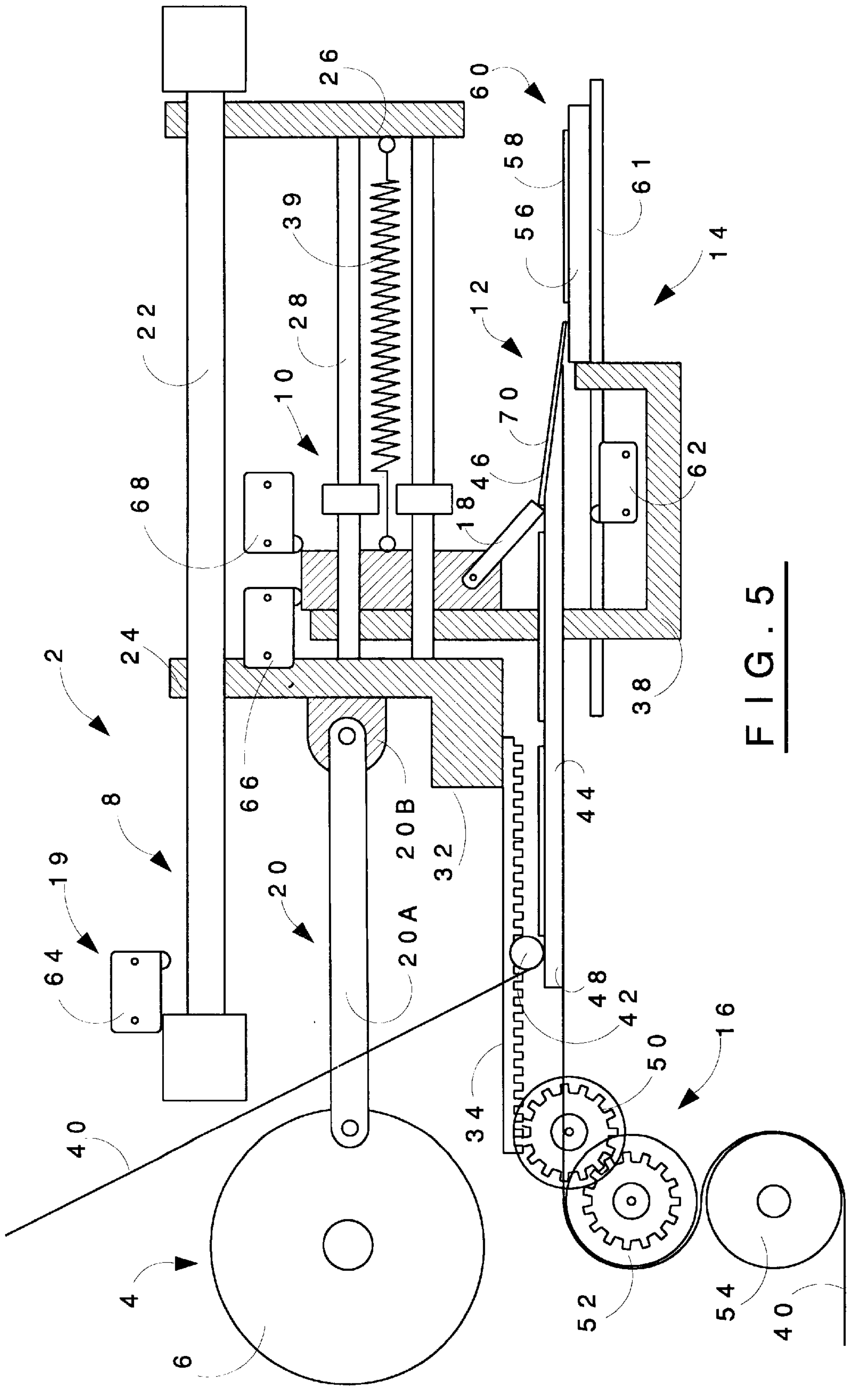

As shown in FIGS. 4 & 5, the current label 58 continues in a forward motion until the free carriage 10 activates the switch 68 to deactivate the clutch pinion 50 which, in turn, stops the rotation of the rollers 52 & 54 and further movement of the web 40 plus succeeding label 70.

Figure 6:
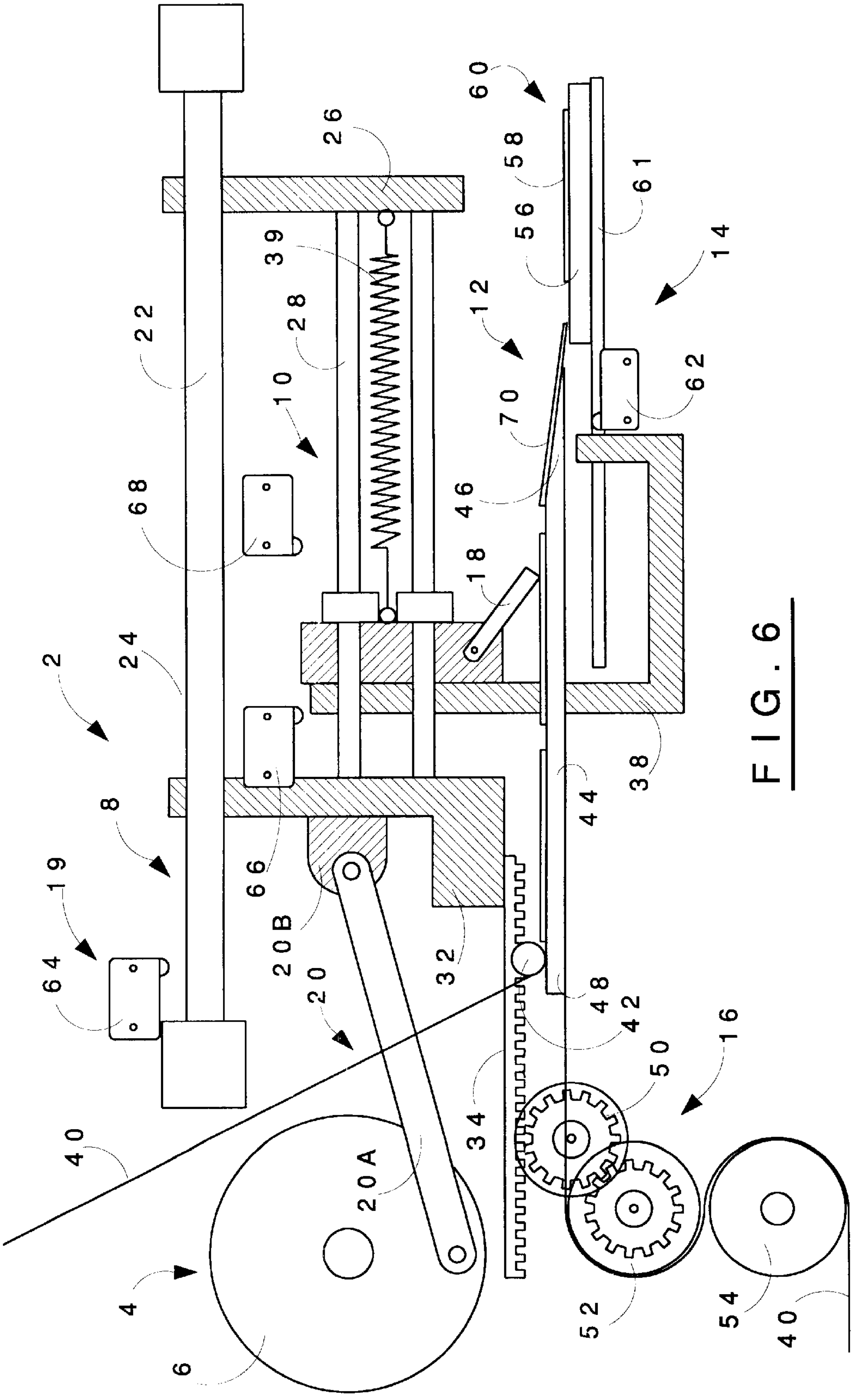

As shown in FIG. 6, on the return stroke of the carriages 8 & 10, the follower member 18, being free to rotate, will ride up over the next label face until the initial point of a new label application cycle is reached as shown in FIG. 1. When this initial start point is reached, the first support 24 of main carriage 8 activates stop switch 64 to stop the motor means 4 allowing the system 2 to remain in standby condition until another article 56 is inserted to recycle the system 2.

Figure 7:
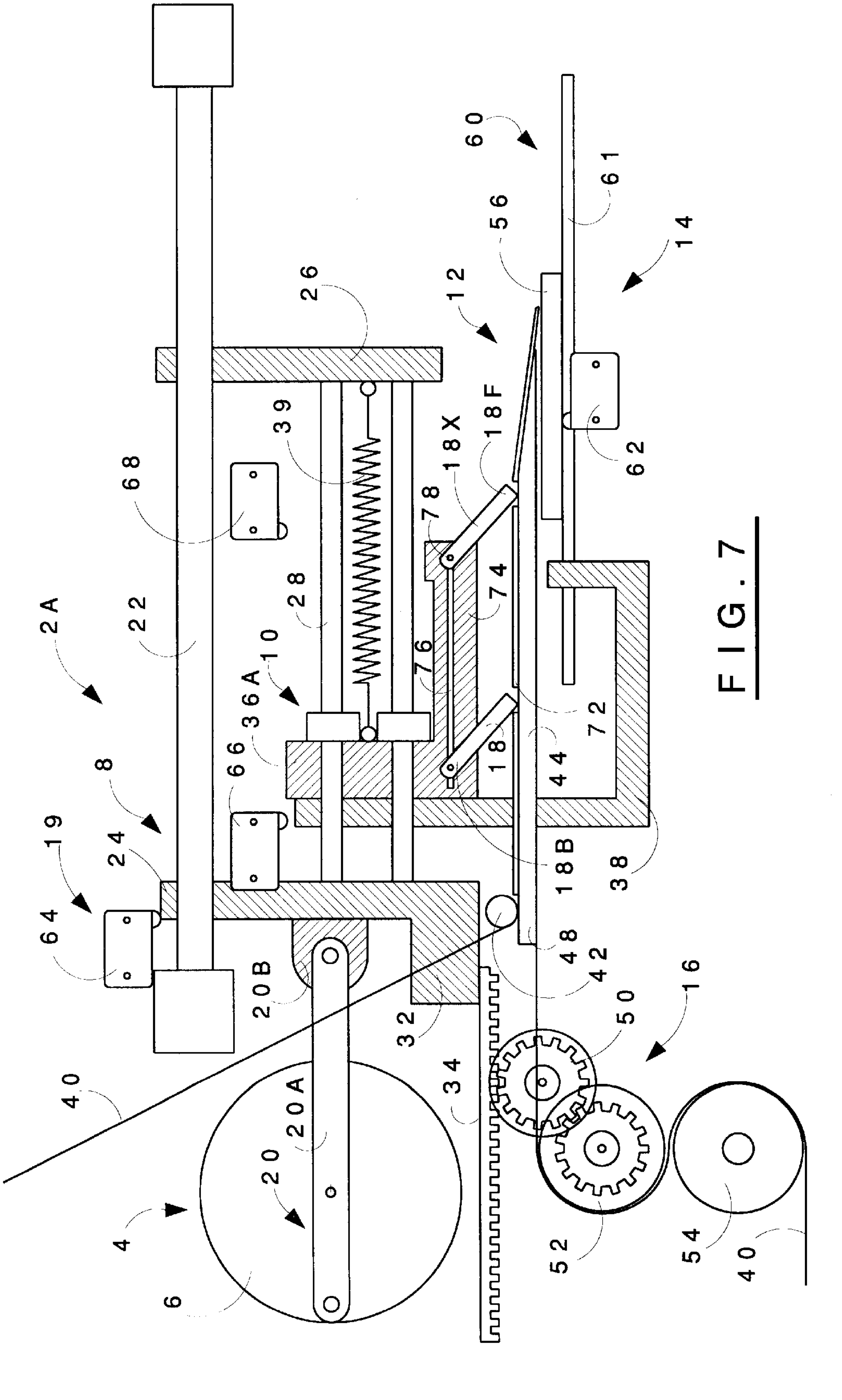
FIG. 7 is similar to FIG. 1, but shows a label applying system of the invention comprising a plurality of label following members.

FIG. 7 shows a label application system 2A of the invention that comprises a plurality of follower members. Thus, the block 36A carries a lateral leg extension 74 to which the end 1 8B of the follower member 18X is pivoted while the end 18B of the follower member 18 is pivoted to the base of block 36A like in the system 2 of FIG. 1. The block 36A and extension 74 carry a slot 76 along which the pivot pins 78 of the follower members 18 & 18X may be held to compensate for labels of varying sizes.

As can be seen from the above invention description, the need for precision label and product sensors are not required in the new label applicators of the invention. The sensors in general use for label sensing are optical interrupter type sensors, so when a clear Mylar® (plastic) label is carried on a clear Mylar plastic web, such type sensors will not function, whereas the new applicators of the invention are not limited in this way. While article speed and label drive rollers speed have been matched in prior know label applicators through use of stepper servo motors with encoders or mechanical linkage, errors can still exist through label web slippage in the drive roller and stretching of the web material. In contrast, in the systems of the present invention, since speed is controlled by the label speed, slippage and speed changes are irrelevant.

I claim:

1. A label application system to precisely apply pressure sensitive adhesive labels to flat uniform articles comprising motor means, a main carriage, a free carriage, label delivery means, article handling means, web handling means, a follower member and electronic control means, said motor means including a crank reciprocated by a drive wheel, said main carriage having a first support and a second support which are spaced apart and slidably carried upon guide rods for reciprocation by said crank, slide rods fixed between said first support and said second support parallel to said guide rods, said free carriage comprising an article pusher slidably carried on said slide rods between said first and second supports and spring means biasing said article pusher for movement toward said second support, said follower member having a first end attached to said free carriage and a label engagement free second end, said label delivery means comprising a label platform defined by an entrance end and a tapered delivery end, said label platform being positioned substantially parallel to and below said slide rods at a distance permitting said follower member free second end to ride on said platform, said web handling means comprising a rack attached to said first support, a clutched pinion, a geared roller driven by said pinion to pull a web from said tapered delivery end of said label platform and a free pinch roller by which said web exits said system, said article handling means including a transport plate to support an article during its movement on said transport plate by said article pusher and article switch means to be activated by said article movement, and said electronic means including a stop switch operatively connected to said motor means and a carriage switch plus a clutch switch both operatively connected to said clutch pinion.

2. A label application system to precisely apply pressure sensitive adhesive labels to flat uniform articles comprising motor means, a main carriage, a free carriage, label delivery means, web handling means, article handling means, a follower member and electronic control means, said motor means being operatively connected to said main carriage, said main carriage including spaced apart first and second supports arranged for reciprocation by said motor means on guide rods between limits determined by said electronic control means, said free carriage being slidably carried on slide rods mounted to said main carriage parallel to said guide rods between said first and second supports, said label delivery means including a label platform defined by an entrance end and a tapered delivery end positioned substantially parallel to and below said slide rods, said label delivery means serving to position said labels as they travel in said system for application to said articles, said web handling means including rollers to pull a web carrying said labels spaced apart thereon from a supply source across said label platform and then to exit said system after removal of said labels from said web, said article handling means serving to move said articles in said system past said tapered delivery end of said label platform, said follower member being operatively connected to said free carriage for movement therewith and having an engagement portion to contact a portion of each of said labels passing in said system toward said tapered delivery end of said label platform and thereby control movement of said free carriage relative to said main carriage, and said electronic control means serving to control operation of said rollers of said web handling means in said pulling of said web.

3. The label application system of claim 2 wherein said follower member comprises a lever having a first end pivoted to said free carriage and a label engagement second end free to drop upon said web traversing said label platform and contact a trailing edge of a label carried by said web.

4. The label application system of claim 3 that comprises a plurality of said follower members and said free carriage includes means enabling the position of said first free ends of said follower members to be adjusted relative to each other.

5. The label application system of claim 2 wherein said web handling means comprising a rack attached to said first support, a clutched pinion, a geared roller driven by said pinion to pull a web from said tapered delivery end of said label platform and a free pinch roller by which said web exits said system.

6. A label application method to precisely apply pressure sensitive adhesive labels defined by a peripheral edge to flat uniform size articles comprising:

delivering said labels carried from a supply source seriatim upon a continuous web along a first fixed path to a stripping station at which said labels are removed from said web, said first fixed path comprising a first straight terminal portion as it approaches said stripping station, moving said articles seriatim to said stripping station along a second fixed path to said stripping station, said second fixed path comprising a second straight terminal portion that parallels said first straight terminal portion as it approachs said stripping station, detecting forward motion of said peripheral edge of each said adhesive label as said label traverses said first fixed path, and controlling the movement of each said article as said article traverses said second fixed path by means of said detected forward motion of said peripheral edge of each said adhesive label.

* * * * *